United States Patent [19]
Watts

[11] 3,904,153
[45] Sept. 9, 1975

[54] STEERABLE AND RETRACTABLE AIRCRAFT NOSE LANDING GEAR ASSEMBLY

[75] Inventor: John Watts, Bellevue, Wash.
[73] Assignee: The Boeing Company, Seattle, Wash.
[22] Filed: Feb. 25, 1974
[21] Appl. No.: 445,073

[52] U.S. Cl. .............................. 244/50; 244/102 SL
[51] Int. Cl.² ................... B64C 25/26; B64C 25/50
[58] Field of Search ......................... 244/50, 102 SL

[56] References Cited
UNITED STATES PATENTS

| | | | |
|---|---|---|---|
| 2,630,990 | 3/1953 | Kanode et al. | 244/102 SL |
| 2,650,782 | 9/1953 | Fehring | 244/50 |
| 2,759,687 | 8/1956 | Hogan | 244/50 |
| 2,779,556 | 1/1957 | Hogan | 244/50 |
| 2,826,381 | 3/1958 | Cruz | 244/102 SL |
| 2,856,138 | 10/1958 | Hogan | 244/50 |
| 2,919,084 | 12/1959 | Lovell | 244/50 |
| 2,930,548 | 3/1960 | Hamilton | 244/50 |
| 2,943,498 | 7/1960 | Smith | 244/50 X |
| 2,943,819 | 7/1960 | Orloff et al. | 244/50 |
| 2,958,481 | 11/1960 | Price | 244/50 |
| 3,006,579 | 10/1961 | Frederick | 244/50 |
| 3,018,986 | 1/1962 | Cameron-Johnson | 244/50 |
| 3,035,793 | 5/1962 | Ralph et al. | 244/50 |

FOREIGN PATENTS OR APPLICATIONS

545,943  6/1942  United Kingdom ................ 244/50

Primary Examiner—Trygve M. Blix
Assistant Examiner—Barry L. Kelmachter
Attorney, Agent, or Firm—Christensen, O'Connor, Garrison & Havelka

[57] ABSTRACT

A steerable and retractable aircraft nose landing gear assembly including a cross link for rapidly connecting and disconnecting the nose wheels from the aircraft steering mechanism and a common locking arrangement for locking the wheels in retracted or extended positions is disclosed. The cross link arrangement connects a movable collar attached to the steering mechanism to a collar affixed to the wheels when the wheels are to be steered by the steering mechanism. Opening of the cross link separates the wheels from the steering mechanism and, thus, allows the aircraft to be freely moved by a towing vehicle without feedback to the steering mechanism occurring. The common locking mechanism comprises a bungee spring operated pair of off-center locking links running between the drag strut linkage and a flange affixed to the aircraft. The operation of an actuator rotates the links against the force created by the bungee spring to unlock the mechanism. When in either the extended or the retracted position, the off-center locking links prevent movement of the drag strut linkage in a manner such that the wheels are prevented from moving to the opposite position.

7 Claims, 6 Drawing Figures

STEERABLE AND RETRACTABLE AIRCRAFT NOSE LANDING GEAR ASSEMBLY

BACKGROUND OF THE INVENTION

This invention is directed to aircraft landing gear and more particularly to aircraft nose landing gear assemblies.

A wide variety of aircraft landing gear assemblies, and in particular aircraft nose landing gear assemblies, have been proposed and are in use. Basically, these assemblies are designed to control the raising and lowering of the aircraft nose wheel. In addition, they are designed to include means for coupling the nose wheel to the steering mechanism of the aircraft so that the aircraft can be steered while on the ground. While the prior art aircraft nose landing gear assemblies have been satisfactory, certain disadvantages remain to be resolved. This invention is directed to overcoming some of these disadvantages.

One of the primary disadvantages of prior art aircraft nose landing gear assemblies is the "feedback" which occurs to the aircraft steering mechanism when the aircraft is being towed by a suitable towing vehicle. That is, because there is a fixed linkage between the nose wheels and the steering mechanism, when the aircraft is towed, the "steering" rotation of the nose wheels causes movement of the steering mechanism. This arrangement is disadvantageous for a variety of reasons. In particular, this arrangement is disadvantageous because it makes steering by the ground vehicle somewhat difficult. In addition, it applies undesired mechanical stresses to the aircraft steering mechanism.

Therefore, it is an object of this invention to provide a new and improved steerable aircraft nose landing gear assembly.

It is a still further object of this invention to provide a steerable aircraft nose landing gear assembly wherein movement of the nose wheel by a towing vehicle is prevented from creating related movement in the steering mechanism of the aircraft with which the nose landing gear assembly is associated.

Another disadvantage of prior art aircraft nose landing gear assemblies relates to the complexity of the mechanism for locking the landing gear assemblies in their extended or retracted positions. In the past, in some cases, separate mechanisms for locking the nose landing gear assemblies in each of the two positions have been required. In other cases, the overall mechanism has been unduly complicated.

Hence, it is a further object of this invention to provide a retractable aircraft nose landing gear assembly which utilizes a common mechanism for locking the wheels in either a retracted or an extended position.

It is yet another object of this invention to provide a retractable aircraft nose landing gear assembly including an uncomplicated common locking mechanism for locking the wheels in either retracted or extended positions.

It is a more complete object of this invention to provide a new and improved steerable and retractable aircraft nose landing gear assembly wherein the wheels can be moved by a ground vehicle without such movement being translated to the steering mechanism of the aircraft and wherein the wheels can be locked in either the retracted or the extended position by an uncomplicated locking mechanism.

SUMMARY OF THE INVENTION

In accordance with principles of this invention, a steerable and retractable aircraft nose landing gear assembly is provided. The steerable and retractable aircraft nose landing gear assembly includes a cross link arrangement that can be utilized to rapidly connect and disconnect the wheels of the aircraft from the aircraft's steering mechanism. Thus, the wheels can be disconnected from the steering mechanism when the aircraft is being towed on the ground by a suitable towing vehicle.

In accordance with further principles of this invention, the steering mechanism includes a steering collar which surrounds the oleo strut. In addition, the wheels are attached via a suitable linkage and arm mechanism to a wheel collar which also surrounds the oleo strut. The collars are connected together by a rapid disconnect cross link. Preferably, the rapid disconnect cross link is rotatably attached to one of the collars and is pinned by a removable pin to the other collar.

In accordance with further principles of this invention, a common mechanism for locking the nose wheels in either the retracted or the extended position by preventing movement of a drag strut linkage is provided.

In accordance with further principles of this invention, the common locking mechanism comprises upper and lower lock links. The lower lock link extends upwardly from a point of attachment to the drag strut linkage. The upper lock link extends downwardly from a flange affixed to the aircraft. The lock links are rotatably joined to one another and, when locked, are maintained off-center in one direction against stops by a bungee spring. One of the lock links, preferably, the upper lock link, includes an arm connected to an actuator. When the actuator is energized, the lock links are moved from their "locked" off-center position and hinge in the opposite direction. The hinge position allows the drag strut linkage to bend and the nose wheels to be moved between their retracted and extended positions by a further actuator member. After moving to the desired position, the first actuator is deactivated and the locked links return to their locked offcenter position under the force created by the bungee spring.

It will be appreciated from the foregoing brief summary that the invention provides a steerable and retractable aircraft nose landing gear assembly. Because the wheels can be disconnected from the aircraft steering mechanism, the aircraft is easily movable by a suitable towing vehicle without the movement of the wheels being applied to the aircraft steering mechanism. Thus, the aircraft is easily moved by the towing vehicle without undesired mechanical stresses being applied to the aircraft steering mechanism.

The locking mechanism for locking the wheels in either the retracted or the extended position is uncomplicated and common to both positions. Moreover, the locking mechanism is fail safe. More specifically, even if the actuator which actuates the locking mechanism fails, the locking mechanism is easily unlocked by merely moving the locking link rotation point from the locked off-center position toward the hinge position against the force of the bungee spring and allowing the wheels to be moved by the wheel raising and lowering actuator. During movement, the wheel raising and lowering actuator force is adequate to prevent link locking, because link locking can only occur in either of the two extreme (extended and retracted) positions.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
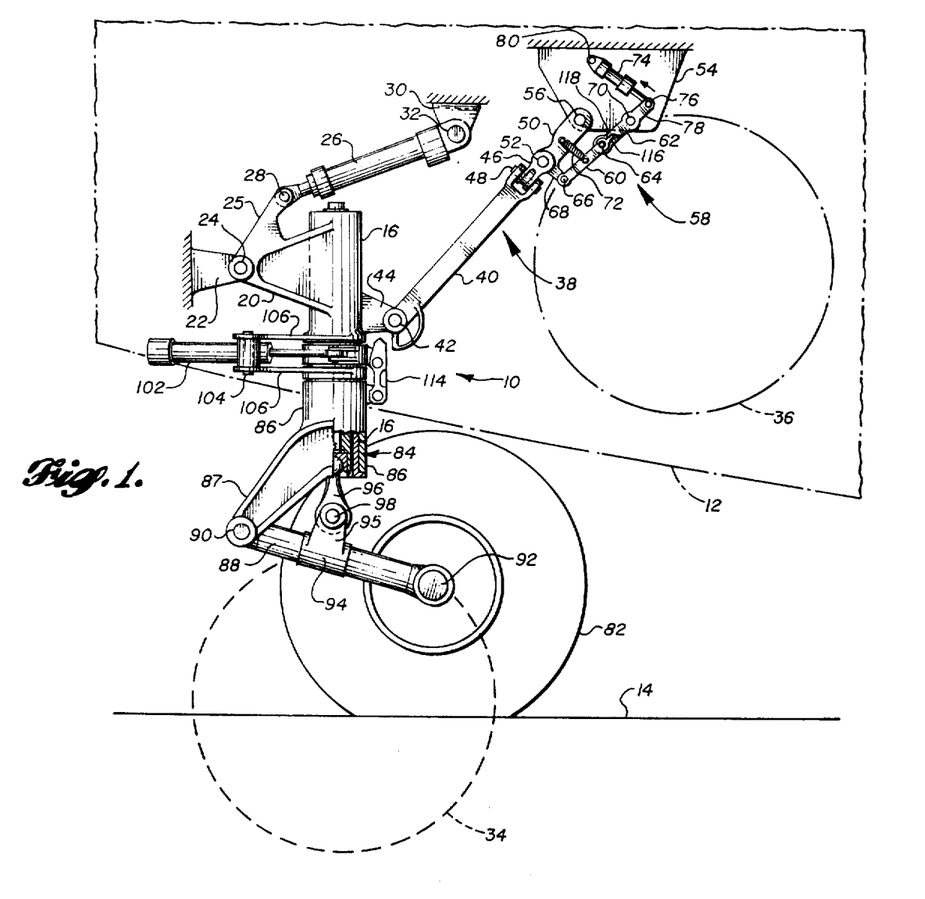
FIG. 1 is a side elevation of a steerable and retractable nose landing gear assembly formed in accordance with the invention in a static position on the ground, with alternate positions of the wheel of the assembly shown in dashed outline (extended and airborne) and dot-dash outline (retracted)
Figure 2:
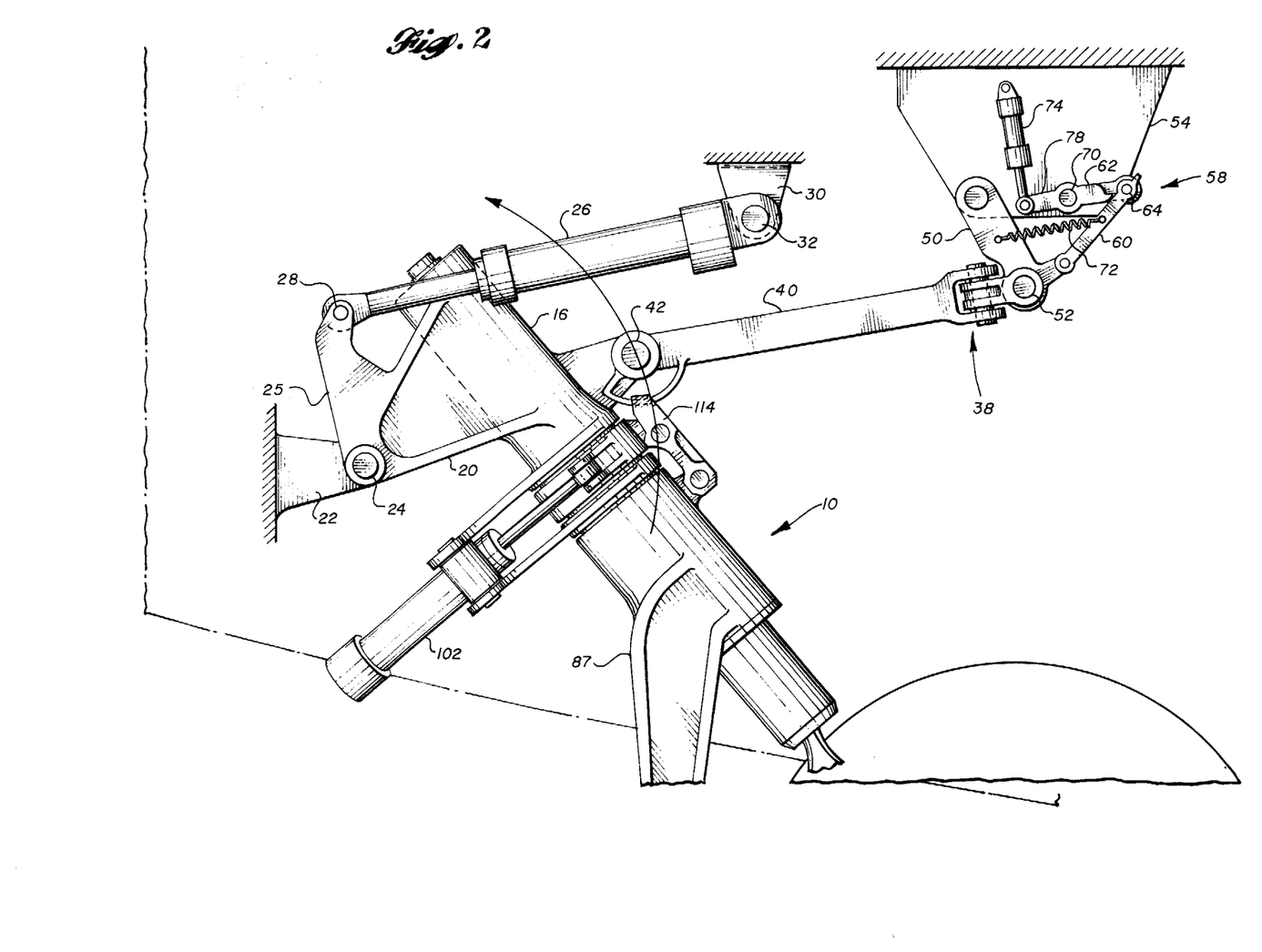
FIG. 2 is an enlarged side elevational view of the landing gear assembly of the type illustrated in FIG. 1 in a partially retracted position.
Figure 3:
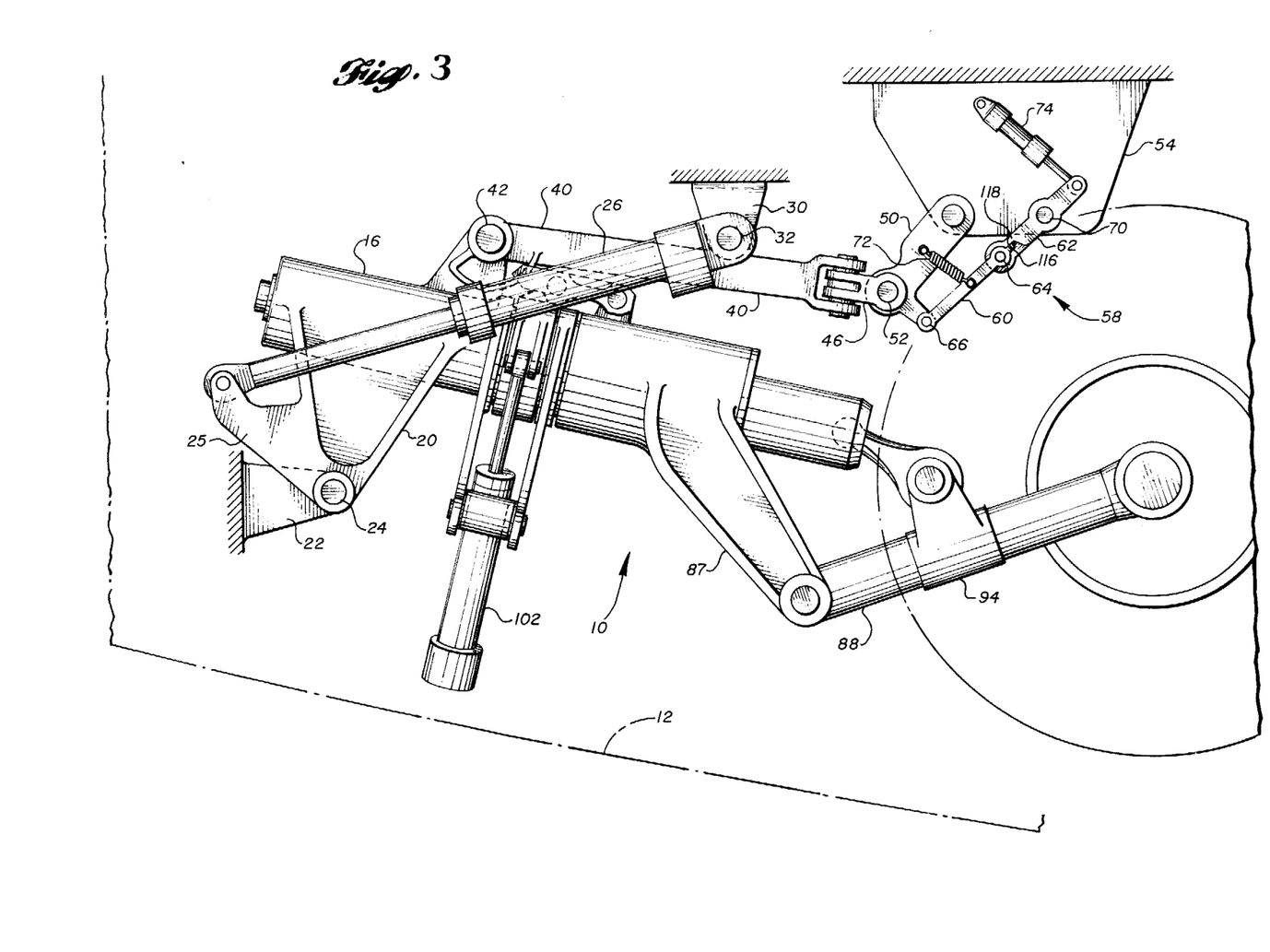
FIG. 3 is an enlarged side elevational view of a landing gear assembly of the type illustrated in FIG. 1 in a fully retracted position.

Turning now to the drawings wherein like reference numerals designate like parts throughout the several views, FIGS. 1 throught 3 illustrate a steerable and retractable aircraft nose landing gear assembly 10 formed in accordance with the invention in operative sequence between extended and retracted positions. Specifically, FIG. 1 illustrates the nose landing gear assembly 10 when the aircraft 12 associated with the nose wheels is on the ground 14. FIG. 2 illustrates the nose landing gear assembly 10 in a partially retracted position, i.e., between extended and retracted. And, FIG. 3 illustrates the nose landing gear assembly 10 fully retracted inside of the aircraft 12.

An oleo strut housing 16 which is generally tubular in cross-section and includes a plurality of connecting arms and flanges, as hereinafter described, houses a conventional oleo shock absorber mechanism 84. The oleo strut housing 16 includes support yokes 20 which extend frontwardly with respect to the aircraft (to the left, as illustrated in the drawings) and outwardly with respect to the longitudinal axis of the oleo strut housing. The support yokes 20 are rotatably pinned by trunnion pins 24 to support flanges 22 which are affixed to the frame of the aircraft and extend rearwardly therefrom toward the oleo strut housing. More specifically, the support yokes, as well as extending frontwardly, also extend outwardly with respect to the longitudinal centerline defined by the oleo strut housing 16. The outer tips of the support yokes are rotatably attached on a one-to-one basis to the pair of support flanges 22, one being located on either side of the oleo strut housing 16, by the trunnion pins 24. The trunnion pins define a generally horizontal axis about which the nose landing gear assembly 10 is rotated when extended and retracted, as hereinafter described.

Extending upwardly and rearwardly from each of the support yokes 20 are oleo retractor flanges 25. The outer tips of the oleo retractor flanges 25 are rotatably pinned by pins 28 to one end of two retractor actuators 26, on a one-to-one basis. The other ends of retractor actuators 26 are each rotatably pinned, by pins 32, to fixed retractor flanges 30 which, in turn, are affixed to the aircraft, above and to the rear of the longitudinal centerline defined by the oleo strut housing when the nose wheels 82 are extended. It should be noted that the pins 28 attaching the retractor actuator 26 to the oleo retractor flanges 25 are displaced, upwardly and rearwardly, from the pins 24 attaching the support yokes 20 to the support flanges 22, when the wheels 82 are extended, by an amount adequate to provide the retractor actuator 26 with sufficient leverage to raise the nose landing gear assembly from an in-flight fully extended position indicated by the dash-dash line 34 to the fully retracted position indicated by the dot-dash line 36.

The oleo strut housing 16 and, thus, the entire nose landing gear assembly 10 is maintained in either the extended position or the retracted position by a drag strut linkage 38 which extends rearwardly and upwardly from the oleo strut housing 16 when the wheels are extended. The drag strut linkage 38 comprises a lower drag strut 40 and an upper drag strut 50 connected together by a universal joint 46. The lower end of the lower drag strut 40 is rotatably connected by a pin 42 to an oleo strut flange 44 which extends rearwardly from the oleo strut housing 16, and is affixed thereto. The longitudinal axis defined by the pin 42 is generally horizontal.

The universal joint 46 allows pivoting about two axes 48 and 52 both transverse to the longitudinal axis defined by the drag strut linkage 38 when the longitudinal axes of the upper and lower drag struts are coaxial. The two axes 48 and 52 are also transverse to one another. The lower of the two axes 48 defines the point of pivoting of the lower drag strut 40 and the upper of the two axes 52 defines the point of pivoting of the upper drag strut 50. The upper axis of pivoting is generally horizontal. The other end of the upper drag strut 50 is rotatably attached to a drag strut flange 54 by a pin 56. The axis of rotation is generally horizontal. The drag strut linkage 38, thus forms a breaking linkage which, when held rigid, forms an inflexible brace running between the oleo strut housing 16 and the drag strut flange 54 and, when broken, allows the nose landing gear assembly 10 to be retracted from its extended position.

Locking of the drag strut linkage 38 against "breaking" is provided by a latch mechanism 58. The latch mechanism 58 not only prevents the drag strut linkage from breaking when the nose landing gear assembly is extended, but also prevents the drag strut linkage from moving from a "broken" position when the nose landing gear assembly is retracted, as will be better understood from the following description. Thus, the latch mechanism 58 is common to both states - wheels extended and wheels retracted.

The latch mechanism 58 comprises a lower lock link 60 and an upper lock link 62 which are rotatably connected together by a pin 64 so as to be movable about a horizontal axis. The lower end of the lower lock link 60 is rotatably attached by a pin 66 to an arm 68 which extends downwardly and rearwardly from the upper drag strut 50 at the point where the upper drag strut 50 is attached to the universal joint 46. The pin 66 allows rotation about a generally horizontal axis.

The upper end of the upper lock link 62 is rotatably attached by a pin 70 to the drag strut flange 54 at a point rearwardly disposed with respect to the point where the upper drag strut 50 is attached to the drag strut flange 54 by the pin 56.

A bungee spring 72 runs between the upper drag link 50 and the lower lock link 60. The bungee spring 72 is attached at one end to the upper drag link 50 at a point intermediate the ends thereof. The other end of the bungee spring is attached to the lower lock link 60 at a point intermediate its ends. The bungee spring 72 continually applies a retractive force, even when the latch mechanism is in a lock state.

Figure 4:
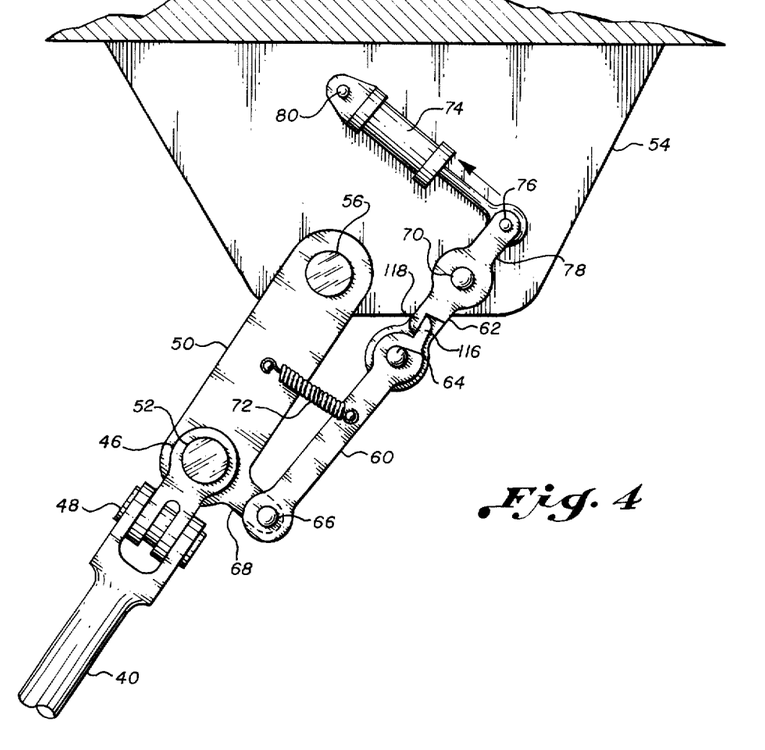
FIG. 4 is an enlarged side elevation of the locking mechanism of the invention.

The lock links 60 and 62 are in an off-center state when the latch mechanism is locked. More specifically, as best viewed in FIG. 4, the lower lock link 60 includes an upwardly projecting stop 116 and the upper lock link 62 includes a downwardly extending stop 118. The stop impinge on one another when the latch mechanism is locked. When such impingement occurs, a kink exists where the longitudinal axes defined by the two lock links meet. The kink points toward the upper drag strut 50. When the latch mechanism is unlocked, the lock links hinge in the opposite direction whereby the kink that occurs where the longitudinal axes defined by the lock links meet points in the opposite direction, i.e., away from the upper drag strut 50, as seen in FIG. 2.

Extending upwardly and rearwardly, preferably along the longitudinal axis of the upper lock link 62, is an arm 78. The remote end of the arm 78 is pivotally attached by a pin 76 to the movable element of an unlock actuator 74. The unlock actuator, extends forwardly and upwardly when the latch mechanism is latched, and is pivotally attached at its other end by a pin 80 to the drag strut flange 54.

When the unlock actuator 74 is energized, it rotates the upper lock link 62 about the pin 70 attaching the upper lock link to the drag strut flange 54. This action causes the lock links 60 and 62 to rotate from their off-center position to their "hinge" position. This action unlocks the drag strut linkage 38 and allows the nose landing gear assembly 10 to be moved from the retracted to the extended position, or vice versa, as the case may be.

Turning now to a detailed description of the operation of the retraction mechanism of the aircraft, FIGS. 1, 2 and 3 form a sequential illustration of the operation of the retraction mechanism starting with the wheels in a down configuration (i.e., extended). More specifically, as illustrated in FIG. 1, the nose wheels 82 are extended and rest on the ground 14. As the aircraft 12 takes off the compressive force on the oleo shock absorber mechanism 84 relaxes and the wheels drop to the position illustrated by the dash line 34. At this point, the drag strut linkage 38 still forms a rigid brace and the latch mechanism 58 is locked in its off-center position. The "locked" state of the latch mechanism prevents any relative motion at the universal joint 46 about the pin 52.

To initiate the retraction cycle, two actuator-powered operations must take place. Initially, the lock actuator 74 is energized. As previously indicated, when this occurs, arm 78 of upper lock link 62 is moved in a counterclockwise direction, as viewed in the drawings. This movement displaces the lock links 60 and 62 from their off-center lock position. Continuation of movement of the arm 78 rotates the lock links 60 and 62 until they move to their hinge unlock position. The hinging action is applied against the force provided by the bungee spring 72, as illustrated in FIG. 2. Hence, the bungee spring expands.

Movement of the lock links toward their hinging position removes the retaining force applied by arm 68 against the universal joint to prevent movement about pin 52. The nose landing gear assembly 10 is now enabled for retraction. Simultaneously with the energization of the lock actuator 74, or slightly subsequent thereto, the retractor actuator 26 is energized. When the retraction actuator is energized, it pushes its drive rod against the pin 28 attaching the drive actuator 26 to the oleo strut housing 16. This action causes the nose landing gear assembly 10 to rotate about trunnion pin 24 as seen in FIG. 2. Continuation of this counterclockwise rotation moves the wheels 82 to their fully retracted position, illustrated in FIG. 3.

As the nose landing gear assembly 10 reaches the fully retracted position, a limit switch (not shown) is activated to de-energize the lock actuator 74. When this occurs, the bungee spring 72, which has continuously pulled on the lower lock link 60 throughout the entire retraction sequence, now becomes the dominant force. The bungee spring force pulls the upper and lower lock links 60 and 62 back into their off-center locked position where the two stops 116 and 118 again contact one another. Even though the drag strut linkage is now broken, the return of the wheels to be extended position is prevented since movement about pin 52 is again prevented by the locked lock links. Thus, the nose landing gear assembly 10 is now locked in the retracted position.

It should be noted that even though the retractor actuator 26 is de-energized subsequent to retraction, the wheels do not tend to drop to an extended position under the effect of gravity. This action is prevented because the tendency for the lower drag strut 40 to pivot about pin 42 is transmitted along the lower drag strut 40 and the universal joint 46 to pin 52. As discussed above, rotation about pin 52 is prevented because the lock links 60 and 62 are in their locked off-center position.

When it is desired to return the landing gear to the extended position, the above described sequence is, in essence, repeated, with a slight modification. Basically, the latch mechanism 58 is unlocked in a similar manner to allow return movement. Gravity, plus the action of the retraction actuator 26 (now in the reverse direction) returns the wheels to their fully extended position. Thereafter, removal of the power applied to the latch actuator 74 allows the lock links to return to their off-center locked position.

Figure 5:
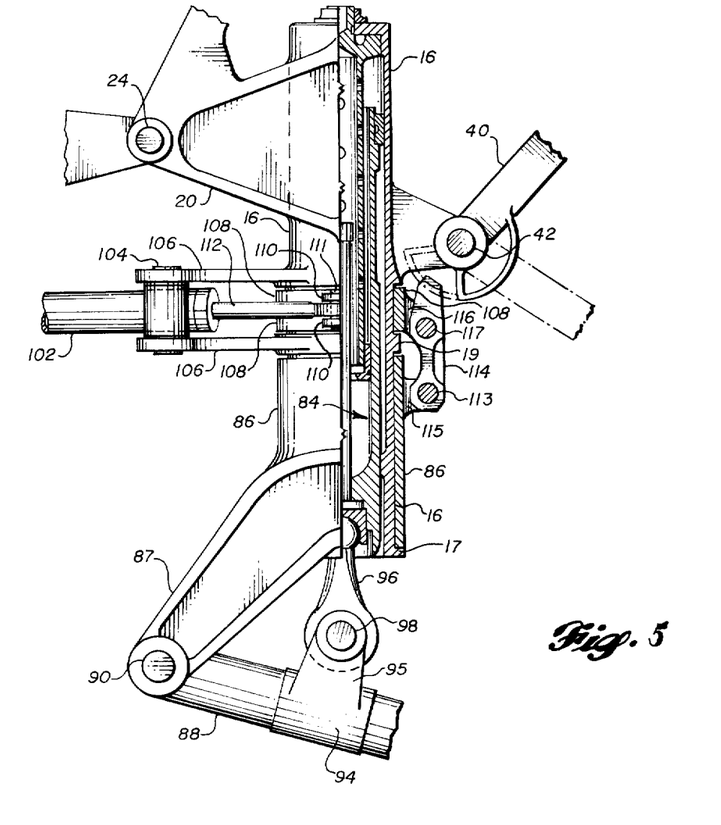
FIG. 5 is an enlarged side elevational view partially in section of an oleo strut housing and steering mechanism of the nose landing gear assembly of the invention; and, FIG. 6 is a top view, partially broken away, of the nose landing gear assembly shown in FIG. 1.
Figure 6:
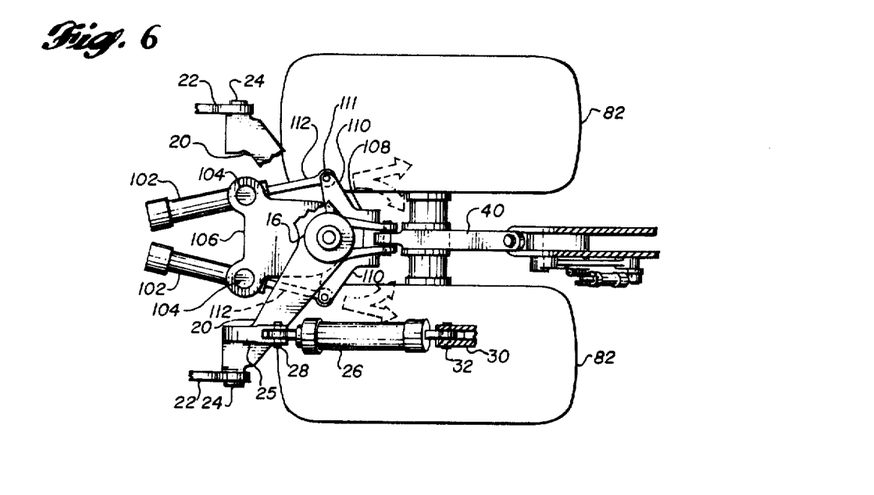

The steering mechanism of the steerable nose landing gear assembly 10 is best illustrated in FIGS. 5 and 6. The wheels 82 are mounted in a manner such that they are linked to the oleo shock absorber mechanism 84 housed in the oleo strut housing 16. The linkage is such that the wheels can be swiveled laterally to provide steerability. As will be better understood from the following description, the wheels can be steered by a towing vehicle or by the steering mechanism of the aircraft.

The steering mechanism comprises a wheel collar 86 which surrounds the tubular oleo strut housing 16. The oleo strut housing 16 includes a bottom outwardly extending ridge 17 and a mid outwardly extending ridge 19, located above and below the wheel collar, respectively, to prevent the axial movement thereof. However, the wheel collar 86 is free to rotate about the oleo strut housing 16. The wheel collar 86 includes an integral arm 87 that extends outwardly (downwardly and forwardly) therefrom. A lever beam 88 is rotatably connected at one end to the outer tip of the arm 87 by a pin 90. The pin 90 defines a horizontal axis of rotation. The lever beam 88 extends rearwardly and its other end is attached to the axis 92 on which the wheels 82 are mounted. A tubular support 94 surrounds the midregion of the lever beam and includes an upwardly extending flange 95 that is rotatably connected by a pin 98 to a ball link 96. The upper end of the ball link 96 is ball-shaped and is retained in a socket formed in the lower end of the oleo shock absorber mechanism 84.

It will be understood by those skilled in the art and others from the foregoing description and viewing FIGS. 5 and 6 that any vertical movement of the wheels 82 relative to the aircraft structure 12 is transmitted to the oleo shock absorber mechanism 84 by the pivotal action of the lever beam 88, through the ball link 96. As will be also understood by those skilled in the art, the oleo shock absorber mechanism 86 utilizes a damping action produced by the flow of a column of liquid through orifices. In this application, the oleo shock absorber mechanism 84 resists the upward movement of the ball link 96 to thereby damp movement of the wheels 82 in a vertical direction. Side forces on the wheels, which may occur during landing of the aircraft 12, cause the ball link 96 to deflect to the side, thereby preventing overloading of the oleo shock absorber mechanism 84.

The wheel collar 86 in conjunction with the lever beam 88 provides a means by which a suitable towing vehicle can be utilized to steer the aircraft. Since the collar is mounted above the oleo strut, and is free to rotate with respect thereto, the towing vehicle can easily steer the wheels 82 and, thus, the aircraft 12. The means for attaching the towing vehicle to the wheels is not shown since it does not form a part of the invention and since a variety of such means can be used.

Aircraft steering of the wheels 82 is provided by a pair of remotely controlled steering actuators 102. The steering actuators 102 derive leverage at pins 104 which rotatably pin the actuators to flanges 106 which extend forwardly from the oleo strut housing 16. More specifically, one steering actuator 102 is located on each side of the oleo strut housing 16. The strut housing includes integral upper and lower flanges 106 which extend forwardly (to the left, as viewed in the Figures). The actuators are rotatably pinned to the flanges 106 by pins 104 which define axes parallel to the longitudinal axis of the oleo strut housing. The steering actuators 102 include drive rods 112 which are rotatably pinned by pins 111 to the remote ends of arms 110 which extend outwardly from a steering collar 108. The steering collar 108 is rotatably mounted on the oleo strut housing 16 above its mid outwardly extending ridge 19. The steering collar 108 is detachably connected to the wheel collar 86 by a steering link 114. The lower end of the steering link 114, more specifically, is rotatably affixed by a pin 113 to a flange 115 extending rearwardly from the wheel collar 86. The upper end of the steering link 114 is pinned by a removable pin 117 to a flange 116 which extends rearwardly from the steering collar 108. When the removable pin 117 is inserted, the steering collar 108 is connected to the wheel collar 86 whereby the steering actuators of the aircraft 12 are adapted to move the wheels 82. However, when the pin 117 is withdrawn and the steering link 114 is rotated rearwardly, the steering actuators are disconnected and, thus, not adapted to move the wheels 82. Yet, a suitable towing vehicle can move the aircraft. When the steering actuators are disconnected, wheel movement caused by the towing vehicle is not transmitted as a force to the steering actuators or other parts of the steering mechanism of the aircraft.

It will be appreciated from the foregoing description that the invention provides a steerable and retractable aircraft nose landing gear assembly. The assembly includes a mechanism for securely locking the wheels in either the retracted or extended positions. The mechanism is uncomplicated, yet provides a positive locking force. Should the mechanism fail, i.e., the locking actuator of the locking mechanism fail, the mechanism can easily be unlocked by merely applying a reversing force against the off-center kink to overcome the bungee spring force. In addition, the invention provides a linkage mechanism which allows the nose wheels to be either connected to the steering mechanism of the aircraft or disconnected therefrom. When disconnected, the aircraft is more readily towed by a towing vehicle.

While a preferred embodiment of the invention has been illustrated and described, it will be appreciated by those skilled in the art and others that various changes can be made therein without departing from the spirit and scope of the invention. Hence, the invention can be practiced otherwise than as specifically described herein.

The embodiments of the invention in which an exclusive property or privilege is claimed are defined as follows:

1. An aircraft nose landing gear assembly comprising:
   shock absorbing means suitable for absorbing the shock applied to aircraft when its nose wheels come in contact with the ground upon landing;
   a cylindrical housing surrounding said shock absorbing means;
   a mounting mechanism for affixing said cylindrical housing to said aircraft;
   wheel support means for supporting aircraft nose wheels in a manner such that said nose wheels are free to move and control the direction of movement of said aircraft when said nose wheels are in contact with the ground, said wheel support means including a wheel collar mounted about one end of said cylindrical housing;
   aircraft steering means for controlling the movement of said wheel support means when attached thereto, said aircraft steering means including a steering collar mounted about said cylindrical housing adjacent to, but spaced from, said wheel collar; and
   manual attachment means for attaching said steering collar to, and detaching said steering collar from, said wheel collar, said manual attachement means comprising a link detachably connected between said steering collar and said wheel collar, said link being formed and connected in a manner such that when said steering collar is detached from said wheel collar, said wheel support means and the aircraft wheels it supports are free to rotate through any desired arc without causing any corresponding movement of said aircraft steering means.

2. An aircraft nose landing gear assembly as claimed in claim 1, wherein said cylindrical housing is rotatably attached to said aircraft; and, including a lockable retraction mechanism suitable for moving said cylindrical housing, said shock absorbing means and said wheel support means between extended and retracted positions.

3. An aircraft nose landing gear assembly as claimed in claim 2, wherein said lockable retraction mechanism comprises:

A. a first actuator extending between said cylindrical housing and a fixed position in said aircraft in a manner such that actuation of said first actuator moves said cylindrical housing, said shock absorber means and said wheel support means between said extended and retracted positions;
  B. a drag strut assembly comprising:
   1. a lower drag strut having one end rotatably attached to said cylindrical housing; and,
   2. an upper drag strut having one end rotatably attached to said aircraft and the other end rotatably attached to said lower drag strut, said upper drag strut including a transverse arm located in the region where said upper and lower drag struts are rotatably attached to one another, said upper and lower drag struts formed and attached in a manner such that:
      a. when said cylindrical housing, said shock absorber means and said wheel support means are in said extended position, said upper and lower drag struts are in an extended position whereat their longitudinal axes are essentially coaxial; and,
      b. when said cylindrical housing, said shock absorber means and said wheel support means are in said retracted position, said upper and lower drag struts are in a retracted position whereat their longitudinal axes define an acute angle; and,
  C. a drag strut locking mechanism suitable for locking said drag strut assembly in either of its extended or retracted positions, said drag strut locking mechanism comprising:
   1. a first lock link having one end rotatably attached to the transverse arm of said upper drag strut;
   2. a second lock link rotatably attached to said aircraft and having one end rotatably attached to the other end of said first lock link, said first and second lock links forming an offset locking mechanism having a single lock position whereat said lock links are substantially coaxial with, but slightly offset from, one another, said offset angle pointing toward said upper drag strut, said single lock position being achieved when said first and second drag struts are in either their extended or their retracted positions, said first and second lock links including fingers formed so as to impinge on one another when said lock links are in their single lock position;
   3. a bungee spring extending between said upper drag strut and said first lock link so as to create a force tending to move said first and second lock links into their single lock position; and,
   4. a second actuator connected between said second lock link and said aircraft creating a force counter to said bungee spring force to move said first and second lock links out of their single lock position.

4. An aircraft nose landing gear assembly as claimed in claim 3 including a universal joint connecting said upper and lower drag struts together.

5. An aircraft nose landing gear assembly comprising:

A. wheel support means rotatably attached to an aircraft for supporting the nose wheels of said aircraft;
  B. a first actuator extending between said wheel support means and a fixed position in said aircraft in a manner such that actuation of said first actuator moves said wheel support means and the nose wheel supported thereby between extended and retracted positions;
  C. a drag strut assembly comprising:
   1. a lower drag strut having one end rotatably attached to said wheel support means; and,
   2. an upper drag strut having one end rotatably attached to said aircraft and the other end rotatably attached to said lower drag strut, said upper drag strut including a transverse arm located in the region where said upper and lower drag struts are rotatably attached to one another, said upper and lower drag struts formed and attached in a manner such that: (a) when said wheel support means is in said extended position said upper and lower drag struts are in an extended position whereat their longitudinal axes are essentially coaxial; and, (b) when said wheel support means is in said retracted position, said upper and lower drag struts are in a retracted position whereat their longitudinal axes define an acute angle with respect to one another; and,
  D. a drag strut locking mechanism suitable for locking said drag strut assembly in either of its extended or retracted positions, said drag strut locking mechanism comprising:
   1. a first lock link having one end rotatably attached to the transverse arm of said upper drag strut;
   2. a second lock link rotatably attached to said aircraft and having one end rotatably attached to the other end of said first lock link, said first and second lock links forming an offset locking mechanism having a single lock position whereat said lock links are substantially coaxial to, but slightly offset from, one another, said offset angle pointing toward said upper drag strut, said single lock position being achieved when said first and second drag struts are in either of their extended or retracted positions, said first and second lock links including fingers formed so as to impinge on one another when said lock links are in their single lock position;
   3. a bungee spring extending between said upper drag strut and said first lock link so as to create a force tending to move said first and second lock links into their single lock position; and,
   4. a second actuator connected to said second lock link for creating a force counter to said bungee spring force to move said first and second lock links out of their single lock position.

6. An aircraft nose landing gear assembly as claimed in claim 5 including a universal joint connecting said upper and lower drag struts together.

7. An aircraft nose landing gear assembly as claimed in claim 6 wherein said second lock link includes an arm extending outwardly, said second actuator connected to said arm of said second lock link.

* * * * *